No. 669,604.　　　　　　　　　　　　　　　　Patented Mar. 12, 1901.
W. R. TWIFORD.
STEREOSCOPE.
(Application filed Mar. 13, 1900.)
(No Model.)
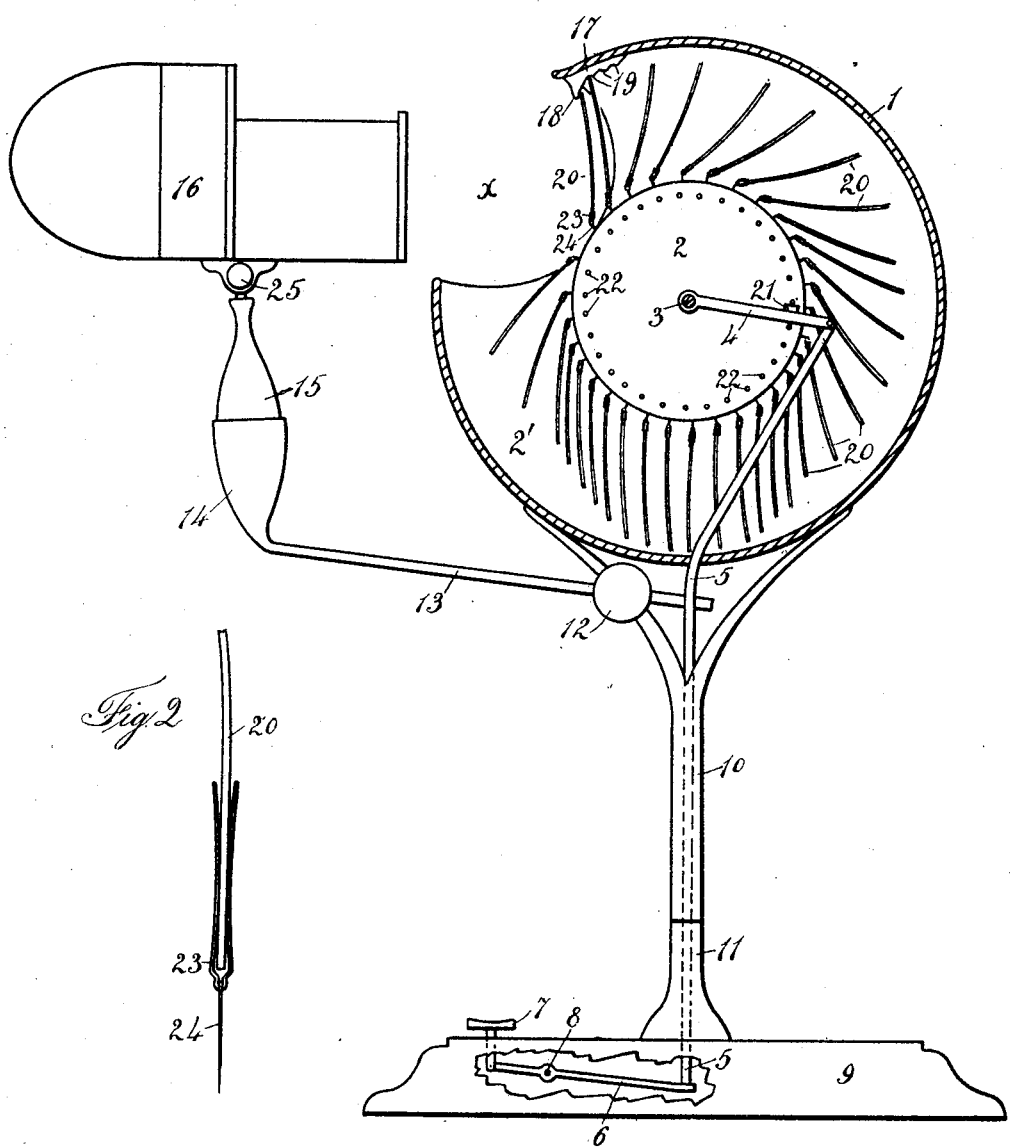

UNITED STATES PATENT OFFICE.

WILLIAM R. TWIFORD, OF UNIVERSITY PLACE, NEBRASKA.

STEREOSCOPE.

SPECIFICATION forming part of Letters Patent No. 669,604, dated March 12, 1901.

Application filed March 13, 1900. Serial No. 8,548. (No model.)

*To all whom it may concern:*

Be it known that I, WILLIAM R. TWIFORD, residing at University Place, in the county of Lancaster and State of Nebraska, have invented certain useful Improvements in Stereoscopes; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in stereoscopes.

The aim of my invention is to provide an educational and entertaining device which at the same time shall be arranged as a housing or receptacle, within which are removably held certain photographs or pictures which are to be used in this exhibiting device.

In the accompanying drawings, Figure 1 shows a side elevation, with portions removed, of a stereoscope embodying my invention, while Fig. 2 shows a broken enlarged detached view of one of the holders as used in my device.

My invention embodies, essentially, a base 9, preferably hollow, from which extends a hub 11, as is shown in Fig. 1.

Working through a slot within the base 9 is an ordinary T-shaped operating-handle 7, which is pivotally secured to a lever 6, mounted upon a shaft 8.

Movably working within the hollow hub 11 is a stem 5, which is curved outward at its upward end, as is shown in Fig. 1.

Working upon the hub 11 is a bracket 10, which above is provided with a circular housing 1, at one point being cut away to provide the opening $x$.

Passing through the sides 2' of the housing 1 is a shaft 3, which supports a drum 2, and to this drum are secured a plurality of ears 24, which ears in turn hold a plurality of spring-holders 23, as is shown more clearly in Fig. 2, and within which ears are removably held photographs or pictures 20 to be exhibited.

Adjustably secured to the bracket 10 is an arm 13, held to the bracket 10 by means of a set-screw 12, so that this arm 13 may be carried toward or from the housing 1 to provide an adjustment for the lenses used in viewing the exhibits within the housing. This arm 13 at its forward end is in the form of a socket, within which socket is held the handle 15, which, by means of a union 25, pivotally supports the lens-holder 16, used in this device, this lens-holder having its range in alinement with the opening $x$ within the housing 1, as is shown in Fig. 1.

The exhibits or pictures 20, which are secured to the hub 2, are of a length so that when they are pendent they easily work within the casing, as is shown in Fig. 1.

The drum 2 upon one side is provided with a series of pins 22, which are adapted to be engaged by a pawl 21, which pawl is secured to and forms part of the lever 4, pivotally secured to the shaft 3 and with its free end secured to the bar 5, as is shown in Fig. 1.

The lever 6 is so posted that its inwardly-extending end is immediately below and supports the rod 5, so that the housing 1 may be freely revolved.

The bracket 10 is hollow, as is also the hub 11, and passing through this hub and bracket and snugly fitting within the same is the bar 5, so that the hub and bracket are connected as long as the bar 5 is revolubly held within the hub. This enables the whole upper portion of the apparatus to be readily removed from the stand. The bar 5 revolves with the housing and freely turns upon the end of the lever 6, but is in no way secured to the same.

At a suitable point the housing 1 above is provided with a downwardly-extending serrated lip, having the shoulders 19 and the lip 18 so arranged that photographs or exhibits 20, which are of a certain length, successively feed into the serrations, the whole being so arranged that the exhibit in coming in contact with the lip 18 is held in a vertical position to permit a free inspection of the photographs through the lenses.

Having thus described my said invention, what I claim as new, and desire to secure by United States Letters Patent, is—

In a stereoscope of the character described, a hollow supporting-standard, a lever pivoted within said standard, provided with a projecting operating-button, an opening within said standard, a shaft extending through said opening and resting below upon said lever, a hollow standard revolubly surrounding said shaft and provided with a suitable housing, a revolving drum within said housing, provided with a plurality of exhibiting-pictures, said drum being provided with a ratchet, a pawl pivoted within said housing, engaging said ratchet and being secured to said shaft, an opening within said housing, and a magnifying device held adjacent said housing and in alinement with said pictures.

WILLIAM R. TWIFORD.

In presence of—
J. WESLEY DUSENBERRY,
FRANK WHIPPERMAN.